Figures 1, 2, 3, 4:
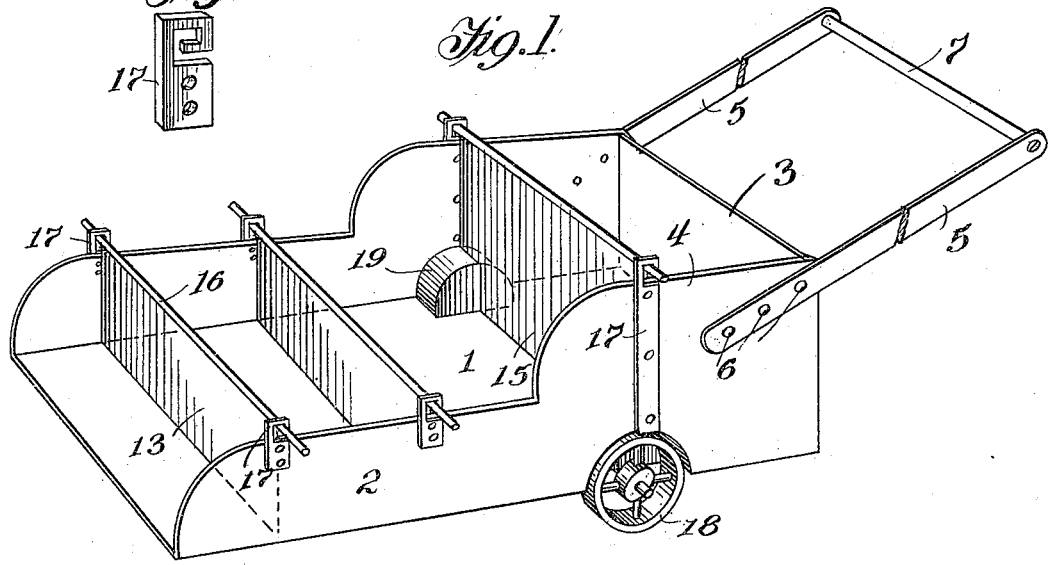

A. J. COMPTON.
COMBINED SHOVEL AND TRUCK.
APPLICATION FILED OCT. 15, 1909.

961,843.

Patented June 21, 1910.

Witnesses
Horace N. Lybrand.
P. M. Smith.

Inventor
Andrew J. Compton

By Victor J. Evans
Attorney

UNITED STATES PATENT OFFICE.

ANDREW J. COMPTON, OF TRENTON, NEW JERSEY.

COMBINED SHOVEL AND TRUCK.

961,843.  Specification of Letters Patent.  Patented June 21, 1910.

Application filed October 15, 1909. Serial No. 522,882.

*To all whom it may concern:*

Be it known that I, ANDREW J. COMPTON, a citizen of the United States, residing at Trenton, in the county of Mercer and State of New Jersey, have invented new and useful Improvements in Combined Shovels and Trucks, of which the following is a specification.

This invention relates to a combined shovel and truck, the object of the invention being to provide a wheeled article of the class referred to designed to facilitate the work of laborers in gathering up the refuse from streets and public highways and also for transporting at one and the same time articles of different characters such as lime, cement, and sand, keeping such articles separated one from another.

A further object of the invention is to provide in connection with a combined truck and shovel, a plurality of hinged and removable dividers or partitions which may be quickly removed and replaced as needed and which may be carried at all times on the device whether such dividers or partitions be in or out of use.

With the above and other objects in view, the invention consists in the novel construction, combination and arrangement hereinafter described and claimed.

In the accompanying drawings:—Figure 1 is a perspective view of a combined shovel and truck embodying the present invention. Fig. 2 is a vertical cross section through the same. Fig. 3 is a fragmentary perspective view showing a modified form of handle. Fig. 4 is a detail perspective of one of the retainer hooks.

The main body of the combined shovel and truck which is preferably rectangular in shape comprises a bottom 1, sides 2, and a back 3, the rear portions of the sides being extended in height to form side guards 4 while the back 3 has a vertical extent equal to that of the portions 4 of the sides 2, thereby forming, as will hereinafter appear, a relatively deep compartment at the rear end of the shovel, as clearly illustrated in Fig. 1. Extending rearward from the body is a handle which, in the preferred embodiment of the invention is composed of parallel handle bars 5 secured to the sides 2 by suitable fasteners 6 and extending backward and upward at a suitable inclination, the rear extremities thereof being connected by a handle or cross bar 7. If desired however, the handle illustrated in Fig. 3 may be employed, the same consisting of a single bar or stock 8 having a T-shaped hand grip 9 at its rear end, while the opposite end thereof is fitted into a socket or sleeve 10 formed on a bracket 11 secured by suitable fasteners 12 to the back of the body of the shovel.

In connection with the combined truck and shovel, herein above described, I employ a plurality of dividers or partitions 13, 14, and 15, each consisting of a plate or board depending from a horizontal supporting bar 16, the opposite ends of which project beyond the ends of the divider and over the top edges and beyond the outer sides of the sides 2 of the body as clearly shown in Fig. 1. In connection with the supporting bar of each divider, a pair of retainer clips 17 are employed, the same being secured to the sides 2 and projecting above the top edges of the sides where said hooks are bent into the form of the letter C so that when the ends of the bar 16 are placed in said hooks with the lower edge of the divider or partition resting against the bottom 1 of the body, the divider or partition as a whole will be securely held in place. The rearmost partition or divider 15 is made of greater height than the other partitions so as to close off the deeper space or compartment at the rear.

While the carrying wheels 18 may be arranged in any suitable manner, for example, upon the outside or at the sides of the body, it is preferred to locate said carrying wheels underneath the bottom 1 or within the plane of the sides 3, so that they will not project beyond the sides, which will enable the device as a whole to be handled in narrowed or circumscribed places. For this purpose, suitable housings 19 are provided as shown in Figs. 1 and 2 within which the upper portions of the wheel move. The rearmost pair of retainer hooks 17 are made long enough to extend downward to the axle 20 on which the wheels 18 are mounted, said hooks being inwardly offset as shown at 21 to extend within the housings 19 and downward far enough to form bearings or hangers for the axle 20 as shown in Fig. 2, the axle being journaled in said hangers and the body of the truck being supported on said hangers.

With the handle constructed and arranged as shown in Fig. 1, the dividers or partitions, when not in use, may be strung upon the handle bars 5 so that the supporting bars 16 will rest on said handle bars, the body portions of the dividers hanging pendent behind the back 3.

What is claimed is:—

1. A combined shovel and truck comprising a body having a bottom, sides and a back, carrying wheels on which the body is mounted, a handle connected with the body, and a plurality of removable dividers or partitions each comprising a supporting bar extending across the top edges of the sides, and retaining means for said supporting bar.

2. A combined shovel and truck comprising a body having a bottom, sides and back, a handle connected to the body, supporting wheels on which the body is mounted, retainer hooks secured to the sides and extending above the top thereof and a plurality of removable dividers or partitions embodying supporting bars extending along the upper edges thereof and across the top edges of the sides and adapted to be moved into and out of engagement with said retainer hooks.

3. A combined shovel and truck comprising a body having a bottom, sides and back, a handle connected to said body, carrying wheels on which the body is supported, C-shaped retainer hooks secured to the upright sides of the body and extending above the same, and a plurality of partitions having supporting bars secured to their upper edges and of a length to project over and beyond the top edges of the sides and adapted for insertion in said retainer hooks and removal therefrom.

In testimony whereof I affix my signature in presence of two witnesses.

ANDREW J. COMPTON.

Witnesses:
E. M. READING,
M. F. McDADE.